ic)United States Patent
Tkacik et al.

(10) Patent No.: US 8,572,410 B1
(45) Date of Patent: Oct. 29, 2013

(54) VIRTUALIZED PROTECTED STORAGE

(75) Inventors: Thomas E. Tkacik, Phoenix, AZ (US);
Carlin R. Covey, Tempe, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/552,527

(22) Filed: Jul. 18, 2012

(51) Int. Cl.
*G06F 21/00* (2013.01)
(52) U.S. Cl.
USPC .............................. 713/193; 713/192; 380/44
(58) Field of Classification Search
USPC ..................................... 713/192, 193; 380/44
See application file for complete search history.

(56) References Cited

U.S. PATENT DOCUMENTS

| 7,103,782 | B1 | 9/2006 | Tugenberg et al. |
| 7,478,246 | B2 | 1/2009 | Arndt et al. |
| 7,512,723 | B2 | 3/2009 | Tkacik et al. |
| 7,694,121 | B2 | 4/2010 | Willman et al. |
| 7,996,687 | B2 | 8/2011 | Arndt et al. |
| 2003/0065933 | A1 | 4/2003 | Hashimoto et al. |
| 2006/0206943 | A1* | 9/2006 | Ellison et al. ................... 726/26 |
| 2007/0297606 | A1 | 12/2007 | Tkacik et al. |
| 2009/0282266 | A1* | 11/2009 | Fries et al. ..................... 713/193 |
| 2012/0250858 | A1* | 10/2012 | Iqbal et al. ....................... 380/44 |
| 2013/0067193 | A1* | 3/2013 | Kagan et al. .................. 711/206 |

* cited by examiner

*Primary Examiner* — Michael Pyzocha

(57) ABSTRACT

Embodiments of an electronic circuit include a cryptographic engine which includes a key derivation function and encryption logic. The key derivation function combines a master secret key with a plurality of key modifiers including at least an operating system tag specific to an operating system, and derives an encryption key from the combined master secret key and plurality of key modifiers. The encryption logic is coupled to the key derivation function and encrypts data using the derived encryption key to generate a cryptographic binary large object (blob) for virtualized protected storage that is accessible only to the operating system specified by the operating system tag.

20 Claims, 11 Drawing Sheets

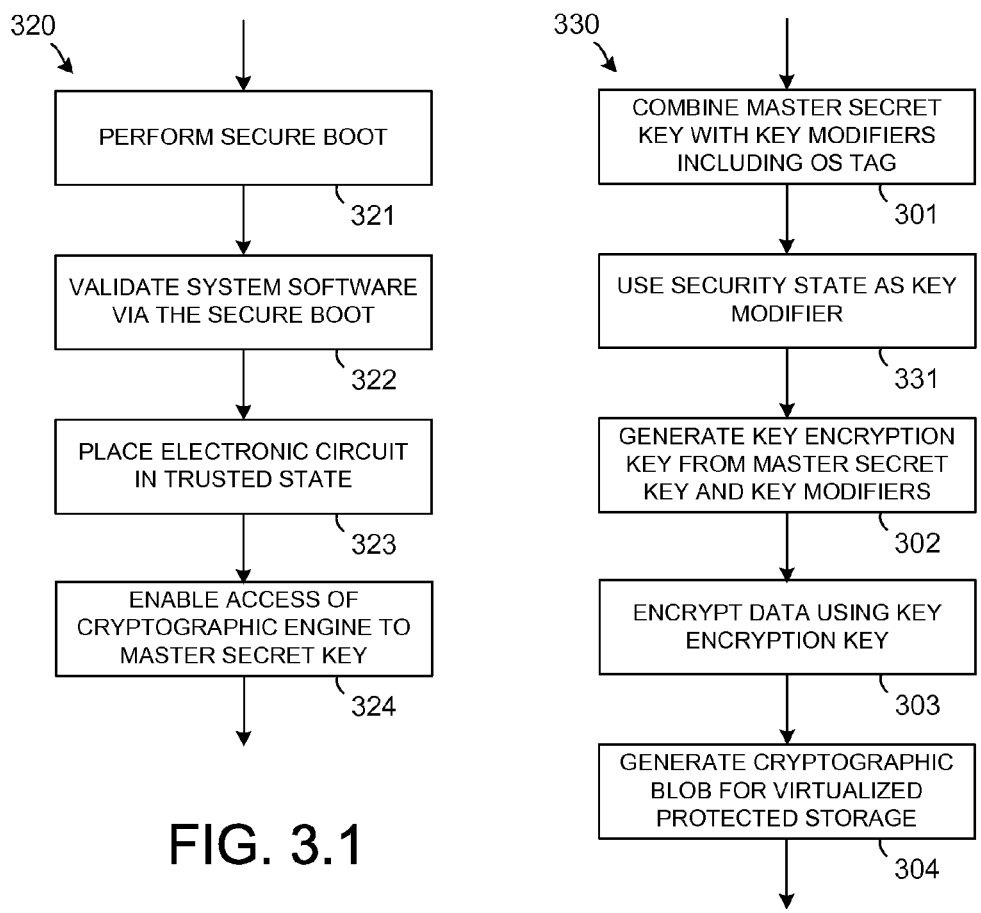
FIG. 3.1

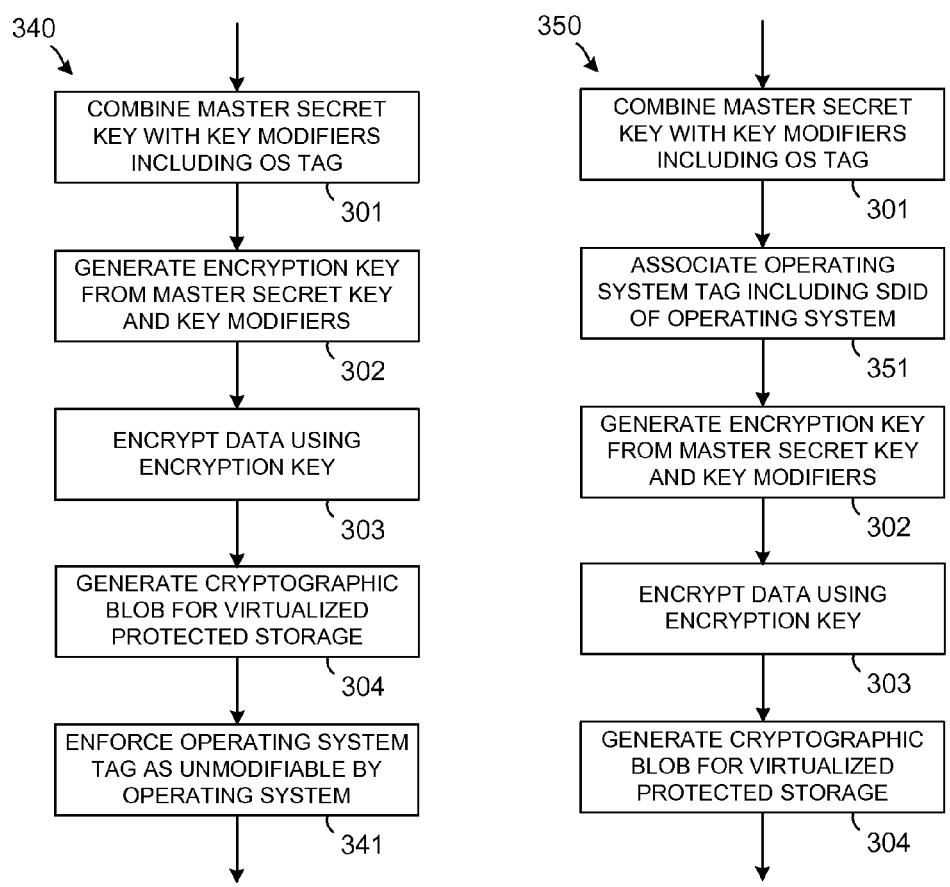
FIG. 3.2

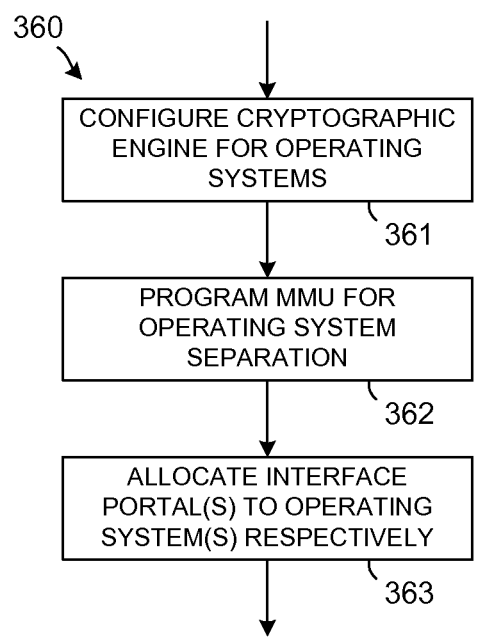
FIG. 3.3

VIRTUALIZED PROTECTED STORAGE

BACKGROUND

Virtual memory is a memory management technique, typically used for multitasking kernels, in which a computer architecture's various forms of computer data storage are virtualized, allowing a program to be designed to access a common type of memory operating in the manner of directly addressable read/write memory or random access memory (RAM). Operating systems that support virtual memory run individual processes in a dedicated address space, specific to a process, enabling the processes to operate as if having sole access to the virtual memory. Virtual memory facilitates application programming by hiding fragmentation of physical memory; by delegating to the kernel the burden of managing the memory hierarchy, thus eliminating application program handling of overlays explicitly. Without virtual memory hardware, whenever program code or data overlays are moved to a new location in memory, the program code may have to be altered so that addresses point correctly to the new locations in memory. When each process is run in a virtual address space, the burden of updating of program code is avoided.

A cryptographic system is a data processing, information processing, computing system, or the like including cryptographic applications and/or functions. Examples of cryptographic systems include secure email systems, smartcards, point of sales terminals, network routers, and the like including methods such as digital signatures, cryptographic hash functions, key management techniques, and the like. Cryptographic systems comprise cryptographic primitives of various levels of complexity.

Typical cryptographic systems include algorithms for key generation, encryption, decryption, digital signatures, and digital signature verification. Ciphers refer to a pair of algorithms, one for encryption and one for decryption. Cryptographic systems commonly use a key generation algorithm and often exploit public key techniques and/or symmetric key techniques.

BRIEF DESCRIPTION OF THE DRAWINGS

Embodiments of the invention relating to both structure and method of operation may best be understood by referring to the following description and accompanying drawings.

DETAILED DESCRIPTION

Figure 1:
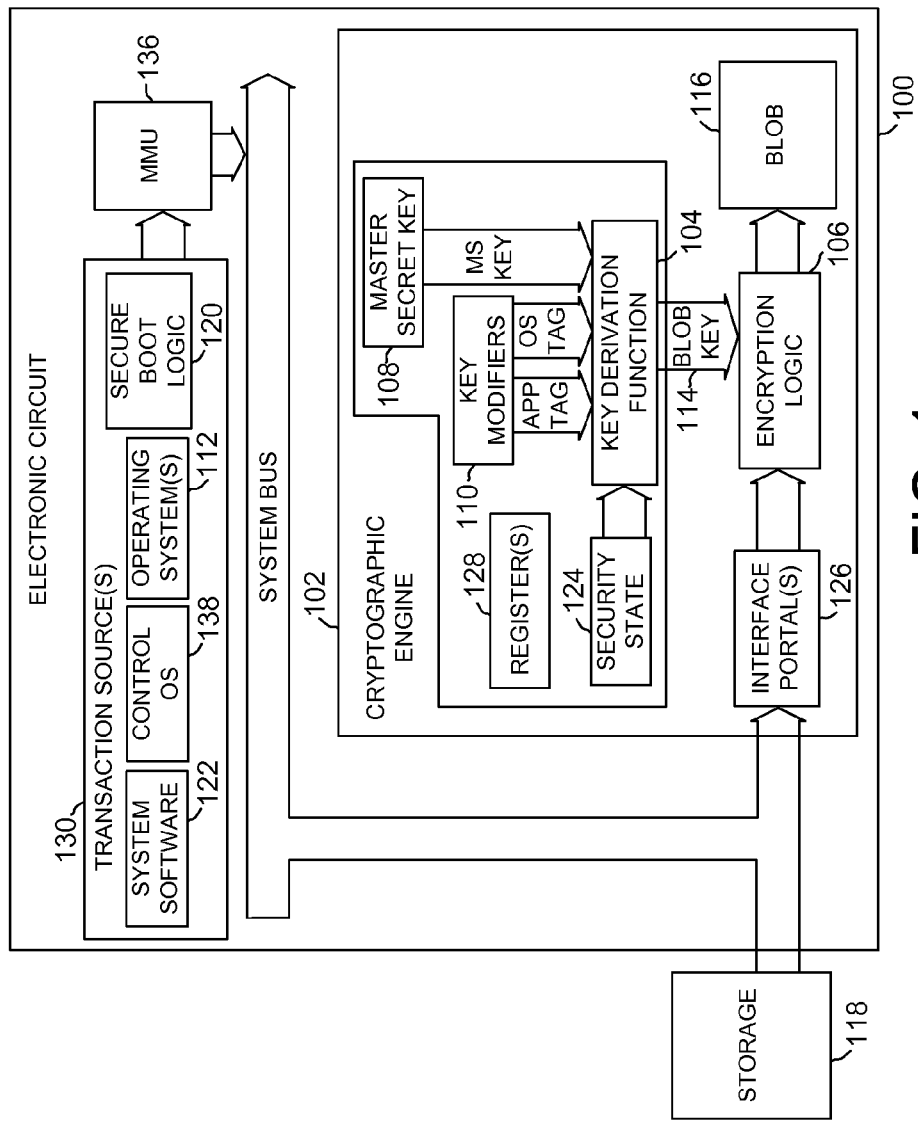
FIG. 1 is a schematic block diagram depicting an embodiment of an electronic circuit that tags a binary large object (blob) with an operating system identifier to restrict access among various operating systems.

Two aspects of trusted computing are process separation and protected storage such as long-term protected storage. A device can include hypervisor support for process separation and a cryptographic module can include cryptographic blobs for long-term protected storage. In various embodiments, cryptographic blobs can enable separation of long-term protected storage between different operating systems running on a single multiple-core device or a single-core device. If a cryptographic binary large object or blob is encrypted using a device unique secret key, a cryptographic blob created on one device cannot be decrypted on a different device. However a cryptographic blob encrypted by one operating system could be decrypted by a different operating system running on the same device. Virtualized protected storage can be created by preventing an operating system from decrypting another operating system's cryptographic blobs on the same device.

Trusted computing can supply more than simply separation between different devices in both single-core and multiple-core devices. The illustrative systems, electronic circuits, and associated operating methods support multiple operating systems running on the same device, and therefore call for separation within a single device. One operating system may be trusted, while a second may not be. The trusted operating system may have secrets to be kept secure, not only from external access, but also from other operating systems running on the same device. The system for virtualized protected storage disclosed herein enables security for long-term secrets for multiple operating systems, which can be stored outside the device when powered-down, and accessible only to the proper operating system when the device is powered-up.

Embodiments of electronic circuits, systems, executable logic, and associated operating methods enable virtualized long-term protected storage in which access is controlled by operating systems in a distributed manner and without overriding management by a hypervisor. The individual operating systems thus can attain direct access to the secure storage component and independently manage secret data. Otherwise, a system that limits direct access to secure storage and limits management of secret data for each guest operating system to the hypervisor alone results in a performance decrease since all operating system requests pass through the hypervisor as a potential bottleneck.

Embodiments of electronic circuits, systems, executable logic, and associated operating methods add an operating system tag to facilitate blob virtualization, preventing a second operating system running on the same device from accessing another operating system's long-term protected storage. The illustrative systems, components, and techniques enable direct access to long-term protected secrets by multiple operating systems running under a hypervisor, on the same device, while maintaining secrets from other operating systems.

Embodiments of electronic circuits, systems, executable logic, and associated operating methods enable operating systems to interact directly with a cryptographic module, engine, or component without the overriding management by a control operating system such as a hypervisor. Guest operating systems can directly send requests to the cryptographic module without controlling action by the hypervisor. Direct interaction of the guest operating systems with the cryptographic module decreases overhead and increases performance. The hypervisor needs to be trusted to maintain confidentiality of guest operating system secrets.

Referring to FIG. 1, a schematic block diagram depicts an embodiment of an electronic circuit that tags a blob with an operating system identifier to restrict access among various operating systems. An embodiment of an electronic circuit 100 can include a cryptographic engine 102 including a key derivation function 104 and encryption logic 106. The key derivation function 104 combines a master secret (MS) key 108 with a plurality of key modifiers 110 including at least an operating system (OS) tag specific to an operating system 112, and derives an encryption key 114 from the combined master secret key 108 and the plurality of key modifiers 110. The encryption logic 106 is coupled to the key derivation function 104 and encrypts data using the derived encryption or blob key 114 to generate a cryptographic blob 116 for protection of data within storage 118 that can be long-term storage and accessible only to the operating system 112 specified by the operating system tag. The cryptographic engine 102 can be implemented in hardware, firmware, software, or the like.

A binary large object or blob is a collection of binary data stored as a single entry in a storage system such as a database management system. Blobs are generally images or objects such as audio or multimedia objects. Blobs can also store binary executable code. Blobs can be used to move large amounts of data from one database to another without filters or error correction, facilitating movement of data by shifting responsibility for error checking and filtering to the host that receives the blob. A cryptographic blob can contain any data for which confidentiality, integrity or authenticity protection is desired. The cryptographic blob can be safely stored in commonly accessible mass storage since the blob content is useless to any process that does not have the blob encryption key. The data to be protected can be contained in the blob and only be retrieved by a process with knowledge of the blob decryption key. As an alternative, the data to be protected could be encrypted separately from the blob, and the key needed to encrypt the data could be directly placed into a blob. Thus the blob can contain the data to be protected or the blob can contain the decryption key used to decrypt data to be protected. Examples of information held in a blob can include software, High-bandwidth Digital Content Protection (HDCP) keys, credit information, and many others. Spreadsheets that are private and contain some private information can be stored in a blob so that the spreadsheet can be encrypted and the key used to encrypt the spreadsheet can be placed in the blob, or the spreadsheet alone can be placed in the blob. The blob can be a general construct for protecting data.

Embodiments of the electronic circuit 100 and associated techniques begin with a secure bootstrap load, placing the device into a trusted state, giving the cryptographic engine 102 access to a device-specific, for example fuse-resident secret key, for encrypting and decrypting blobs. According to some embodiments, the electronic circuit 100 can be configured such that the cryptographic engine 102 receives a cryptographic blob 116 from storage 118, and the encryption logic 106 decrypts the cryptographic blob 116 using the encryption or blob key 114. In further embodiments, the electronic circuit 100 can further include secure boot logic 120 that performs a secure boot that validates system software 122 and places the electronic circuit 100 in a trusted state enabling access by the cryptographic engine 102 to the master secret key 108.

The blob can be tagged with the security state and a user-identified tag, in addition to a tag identifying the creating operating system which can be added along with other tags. Thus in various embodiments and/or applications, the electronic circuit 100 can be configured such that the encryption logic 106 generates a cryptographic blob 116 that is tagged with a security state 124 of the electronic circuit 100, a user-specified application tag, and the operating system tag.

The electronic circuit 100 tags the blob 116 with the operating system identifier to restrict access among various operating systems 112. The tag is hardware enforced and cannot be modified by an operating system. Hence in illustrative embodiments, the electronic circuit 100 can be configured such that the operating system tag is enforced by the electronic circuit 100 and unmodifiable by the operating system 112.

The cryptographic engine 102 can identify each operating system 112 by virtue of an interface portal 126 specific to operating system 112. The interface portal 126 is a range of addresses within the device peripheral address map. In some embodiments and/or applications, the specific transaction source 130 (e.g., one of system software 122, a control OS 138, another operating system 112, or secure boot logic 120) can be identified by a transaction identifier based on bus signals such as a logical input/output device number or a master identifier. In other embodiments and/or applications, the transaction identifier of a transaction source 130 can be a software source identified by a software identifier. The transaction identifier of a transaction source 130 can be used by the cryptographic engine 102 when initiating a direct memory access (DMA) transaction. The transaction identifier of a transaction source 130 can also be used to identify external bus transactions for either a core processor or other DMA engine and enables the cryptographic module 102 to identify the source of a bus transaction to internal registers such as the software portals. The transaction identifier of a transaction source 130 can thus be used as the operating system tag. Accordingly, in various embodiments, the electronic circuit 100 can be configured such that the operating system tag is a software-associated identifier such as a security domain identifier (SDID) associated with the operating system 112. A security domain specifies the protected resources that can be accessed by a particular operating system and that are protected against access by other operating systems. Other embodiments of the electronic circuit 100 can further include one or more interface portals 126, and the operating system tag is a hardware interface tag specified by the one or more interface portals 126. In an illustrative embodiment, the interface portals 126 and transaction identifier registers 128 used by the cryptographic engine are contained within the cryptographic engine 102. Other sources of bus transactions (DMA devices) are outside of the cryptographic engine 102.

The interface portal 126 is a construct, for example implemented in hardware, enabling communication with the cryptographic engine 102. The interface portal 126 can be one or more registers within a specific bus address range that enables software to perform a specific task involving communication with the cryptographic engine 102. In an illustrative embodiment, the interface portal 126 can be a set of registers 128 inside the cryptographic engine 102 located in the device peripheral address map. The cryptographic engine 102 can include one or more interface portals 126 for use by software to communicate with the cryptographic engine 102. A particular interface portal 126 can be used to write to the cryptographic engine 102 to identify what software is performing the communication and thus identify the operating system.

In some embodiments, only supervisor software such as a control operating system or hypervisor can modify the operating system tag. All of the tags 110 are applied along with the master secret key 108 and the security state 124 to a Key Derivation Function (KDF) 104 to create the blob key 114. If the device is not properly booted or a request comes through a different portal 126, then the key derivation function 104 will produce a blob key 114 with a different value, with the consequence that the blob 116 will not be properly decrypted. In some embodiments, the tag can also be placed in the blob 116, and specifically checked by hardware.

Accordingly, the electronic circuit 100 can further include at least one memory management unit (MMU) 136, a plurality of interface portals 126, and a control operating system 138, for example a hypervisor, that configures the cryptographic engine 102 for a plurality of operating systems 112, and programs the one or more MMUs 136 for operating system separation. The cryptographic engine 102 can be configured to allocate one or more of the plurality of operating systems 112. Various embodiments can include any suitable memory management device. For example, a system MMU can be used to constrain the ranges of bus addresses that are accessible by a particular software transaction source 130 running on a Central Processing Unit (CPU). In another example, a peripheral address management unit (PAMU) can similarly be used to constrain the range of bus addresses that are accessible by peripheral DMA engines.

The hypervisor or other control operating system 138 configures the cryptographic engine 102 for example by writing the SDID into the cryptographic engine registers 128, allowing a guest operating system 112 to issue a command to access and create blobs 116 that are associated with and secured to the particular guest operating system 112, independently of the hypervisor. The guest operating system 112 can access associated blobs 116 freely after the hypervisor has configured the cryptographic engine 102 properly.

Figure 2:
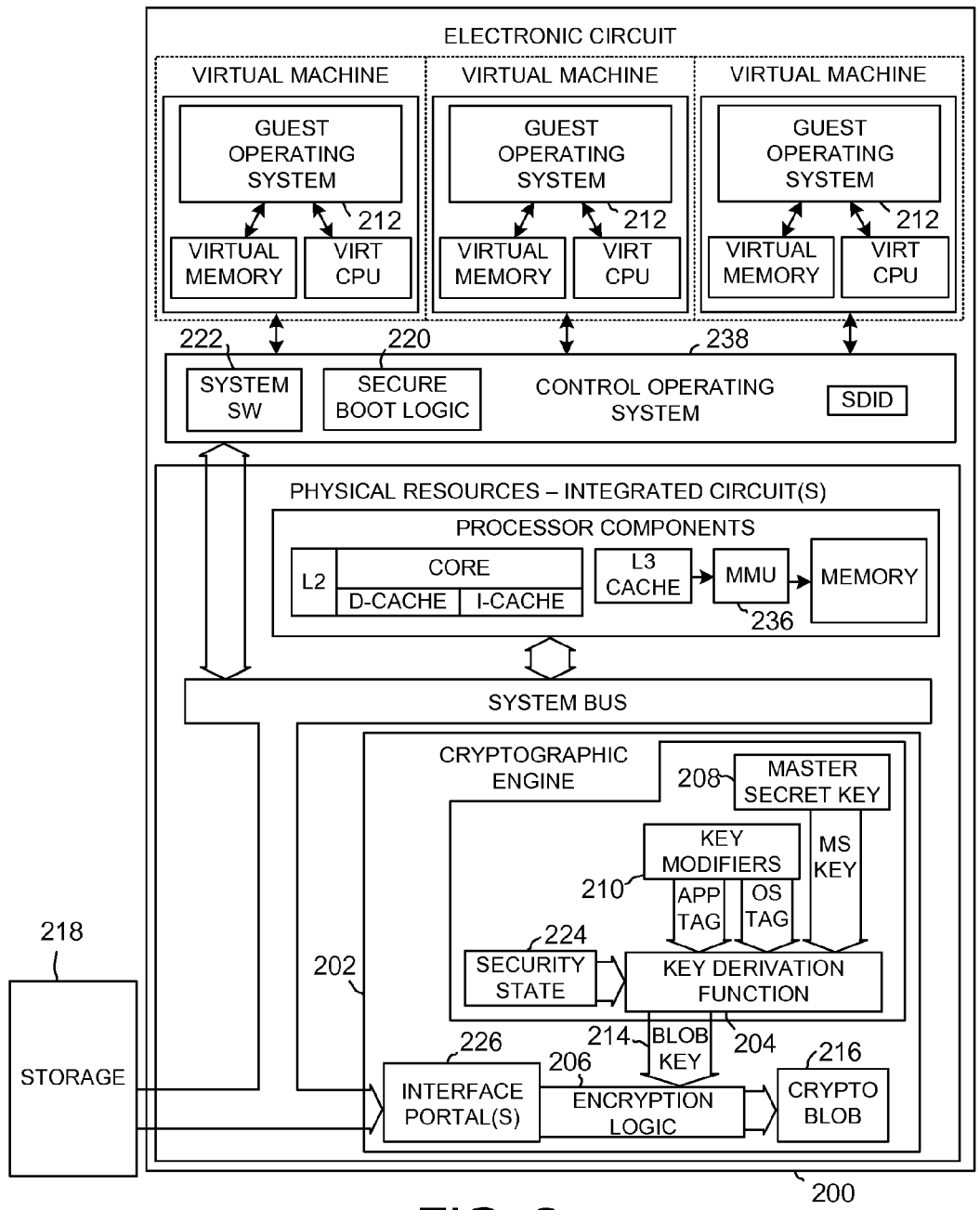
FIG. 2 is a schematic block diagram illustrating an embodiment of a virtualized protected storage system that supports trusted computing including process separation and protected storage such as long-term protected storage.

Referring to FIG. 2, a schematic block diagram illustrates an embodiment of a virtualized protected storage system 200 that supports trusted computing including process separation and protected storage such as long-term protected storage. Trusted computing describes the behavior of computers and systems constrained to function in expected ways, with behaviors enforced by computer hardware and trustworthy software. Part of trusted computing behavior can be assisted by loading the hardware with a unique encryption key inaccessible to the rest of the system. Process separation constrains the ability of operating systems and processes executing under control of the operating systems to access resources. The goal is to allow access to those resources that are allocated to the operating systems and processes and prevent access to the resources allocated to other operating systems and processes. Protected storage is memory, either volatile or non-volatile, that is protected by security techniques such as encryption. In an illustrative embodiment, a virtualized protected storage system 200 includes at least one MMU 236, a plurality of interface portals 226, a control operating system 238, and a cryptographic engine 202. The control operating system 238 runs a plurality of operating systems 212, programs the one or more memory management units 236 for process separation and allocates one or more of the plurality of interface portals 226 respectively to one or more of the plurality of operating systems 212. The cryptographic engine 202 includes a key derivation function 204 and encryption logic 206. The key derivation function 204 combines a master secret key 208 with a plurality of key modifiers 210 including at least an operating system tag specific to an operating system 212, and derives an encryption key 214 from the combined master secret key 208 and plurality of key modifiers 210. The encryption logic 206 is coupled to the key derivation function 204 and encrypts data using the derived encryption key 214 to generate a cryptographic blob 216 that is accessible only to the operating system 212 specified by the operating system tag. The encryption key can also be termed a blob key 214.

In some embodiments, the virtualized protected storage system 200 can further include storage 218, a cryptographic engine 202 that is configured to receive a cryptographic blob 216 from the storage 218, and encryption logic 206 configured to decrypt the cryptographic blob 216 using the encryption key 214. In various embodiments and/or applications, the virtualized protected storage system 200 can further include secure boot logic 220 that performs a secure bootstrap load (boot) that validates system software (SW) 222 and places the virtualized protected storage system 200 in a trusted state enabling access by the cryptographic engine 202 to the master secret key 208.

In further embodiments, the virtualized protected storage system 200 can be configured such that the encryption logic 202 generates a cryptographic blob 216 that is tagged with the security state 224 of the electronic circuit, a user-specified application tag, and the operating system tag. The operating system tag can be a security domain identifier associated with the operating system 212 and is enforced by hardware (for example, the cryptographic module 202) and unmodifiable by the operating system 212. In still further embodiments, the virtualized protected storage system 200 can further include at least one interface portal 226 such that the operating system tag is a hardware interface tag specified by the at least one interface portal 226.

At system startup, the virtualized protected storage system 200 can perform a secure boot that validates the system software 222, and puts the system 200 into a trusted state. The control operating system 238, for example a hypervisor, configures the system 200 for multiple operating systems 212, programming the MMUs 236 to provide process separation. Each operating system 212 attains access to a different portal of the cryptographic engine 202. The hypervisor 238 configures the cryptographic engine 202, allocating a portal 226 to each operating system 212, and specifying the operating system tag.

When the cryptographic engine 202 is instructed to create a blob 216, the cryptographic engine 202 derives a blob key 214 for example using a hash function such as Secure Hash Algorithm-256 (SHA-256):

Blob_Key_1=SHA256 (Master_Secret, User_Tag, Security_State, SDID_1).

The encryption engine 202 encrypts the blob 216 with Blob_Key_1. Encrypting the blob protects the confidentiality of data within the blob. The cryptographic blob 216 can additionally be digitally signed to protect the integrity of the data within the blob, for example using SHA-256 Hash-based Message Authentication Code (HMAC) with a master secret key 208 or a blob key 214. Confidentiality and integrity of data within the blob can be ensured simultaneously if the blob is encrypted with a cryptographic algorithm such as Advanced Encryption Standard-Counter mode with a Cipher Block Chaining Message Authentication Code (CBC-MAC) such as AES-CCM, which produces both encrypted data and an integrity check value (ICV) or Message Authentication Code (MAC), such as a "digital signature".

A user can allocate several different key modifiers and create multiple different blobs 216 for simple blob identity checking. For example the key modifiers can be used to ensure when unpacking a public key or a private signing key from a blob 216 that protected information such as an HDCP key is not unpacked. To prevent the accidental or malicious substitution of one blob for another, the user can supply a certain key modifier value when encrypting a blob, and then supply the same key modifier value when decrypting the blob. If the wrong blob is decrypted, the key modifier will not be correct, thus the blob key will not be correct and the signature checking procedure will indicate that the signature is incorrect. Thus, if unpacking is successful, the decrypted blob content is known to be an HDCP key and the HDCP key is known to be correct. The operating system identifier is also a tag operable as a key modifier. The cryptographic blob 216 can be tagged with multiple key modifiers including a user tag, security state, and operating system identifier so that the blob 216 can be tagged in different ways. The operating system identifier is a key modifier that enables virtualization of resources and the capability to distinguish between blobs owned by different operating systems and processes.

Operations of the electronic circuit 200 enable separation among software executing on the same device. A secure boot validates the authenticity and integrity of the system software. Secure boot logic 220 can be a boot ROM so that every time the electronic circuit 200 is powered on, the secure boot is run, activating a security state machine and placing the system in a trusted or secure state, which enables cryptographic blobs 216 to be tagged with a security state. The secure boot runs digital signature verification on the system software that executes on the electronic circuit 200 using a super root key that is used to validate the signature over the system code. In a particular embodiment, the system can hash the super root key and place the resulting hash value into the electronic circuit chip and, in some implementations, fuses that prevent unauthorized modification. The secure boot ensures that appropriate software runs on the electronic circuit 200 using boot code that transitions from the system state to a trusted or secure state. The secure boot code can load a boot image, operative for example as a hypervisor, virtual machine monitor, or other control operating system.

In an embodiment that uses a hypervisor as a control operating system 238, the hypervisor 238 can configure and manage all operations by running guest operating systems 212. The hypervisor 238 can configure the device 200 to run multiple operating systems 212, and program MMUs to form separation between the operating systems so the operating systems cannot have access to data in memory that is secured for other operating systems. The hypervisor 238 assigns SDIDs for each operating system, and launches the operating systems to enable the operating systems to execute. The hypervisor 238 can configure the cryptographic engine 202 and software portals 226. The individual operating systems 212 can attain access to a specific region of memory associated with the cryptographic engine 202, write commands and read status back. The hypervisor 238 associates a different SDID with the individual software portals 226, enabling the multiple operating systems 212 to communicate with the cryptographic engine 202 concurrently. Various embodiments of the electronic circuit 200 can include a single software portal 226 and a single SDID, or multiple software portals 226 and multiple SDIDs. In some applications, the hypervisor 238 can change the MMU for a first guest operating system 212 to no longer communicate with the cryptographic engine 202, and can change the SDID for a second, different guest operating system 212 and grant the second guest operating system 212 access to the cryptographic engine 202. The second operating system 212 can now communicate with the cryptographic engine 202 and the SDID for the second operating system 212 is then programmed into cryptographic engine 202. Thus, different guest operating systems 212 communicate with the cryptographic engine 202 at different times using a single portal 226, in a single address space. Or multiple address spaces can be used to enable the multiple guest operating systems 212 to communicate with cryptographic engine 202 simultaneously. In either case, a specific guest operating system 212 communicates with the cryptographic engine 202, reading or writing registers, and issuing commands in which the SDID programmed into cryptographic engine 202 at a given time is associated with the specific guest operating system 212 that cannot change the SDID. When a guest operating system 212 creates a cryptographic blob 216 for its use, the guest operating system 212 specifies data to the cryptographic engine 202 for forming into the cryptographic blob 216 using a master secret such as a secret key formed into fuses into an integrated circuit chip, and which secret key can be different for different chips. The blobs 216 are thus tagged to enable proper decryption only on a single instance of the chip.

Figure 3:
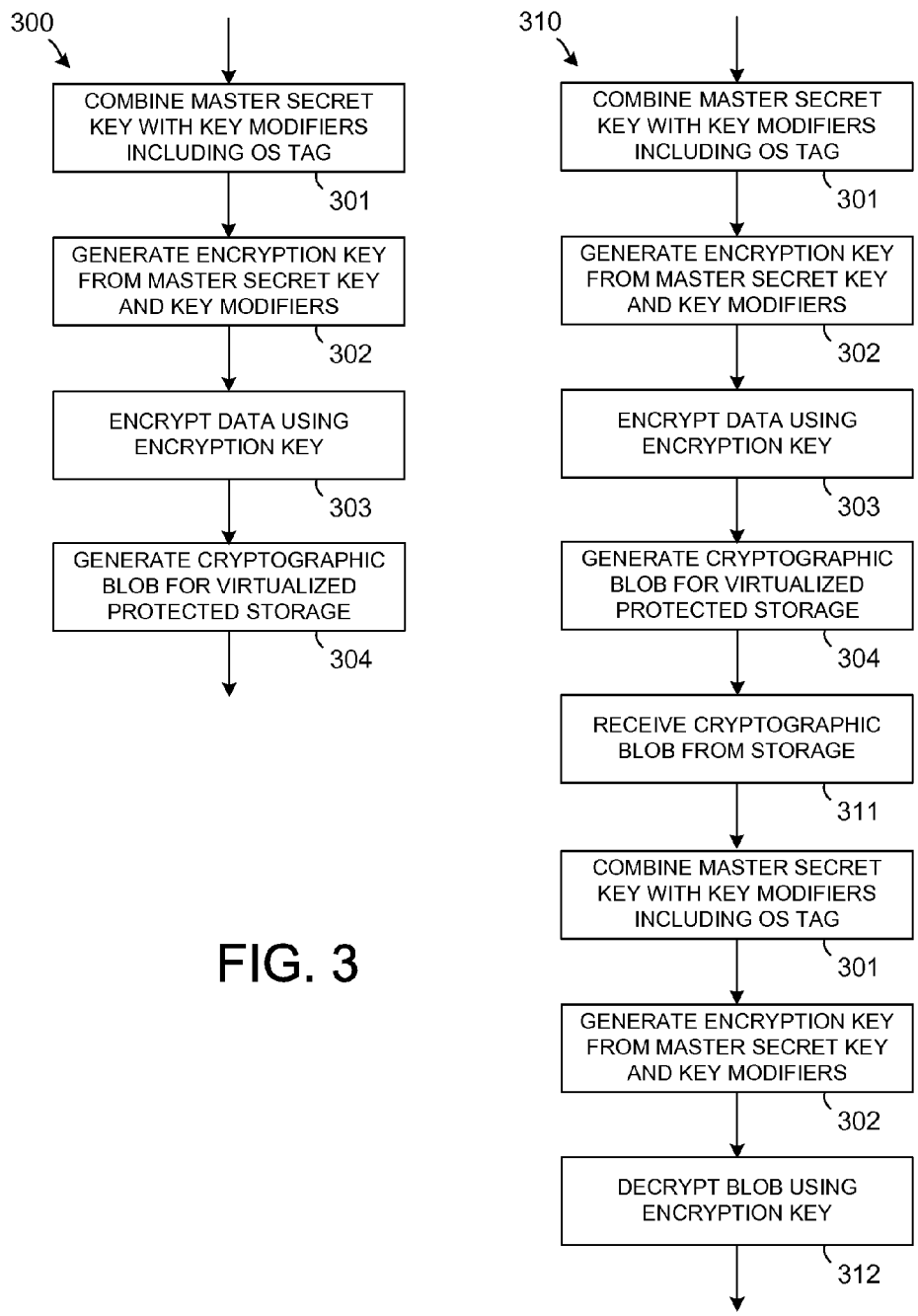
FIG. 3, including FIGS. 3.1, 3.2, and 3.3, are schematic flow charts showing an embodiment or embodiments of a method for operating an electronic circuit that supports trusted computing including process separation and protected storage such as long-term protected storage.

FIG. 3, including FIGS. 3.1, 3.2, and 3.3, shows schematic flow charts illustrating an embodiment or embodiments of a method for operating an electronic circuit that supports trusted computing including process separation and protected storage such as long-term protected storage. An embodiment of a method 300 of operating an electronic circuit can include combining 301 a master secret key with a plurality of key modifiers including at least an operating system tag specific to an operating system, generating 302 a encryption key (or blob key) from the combined master secret key and plurality of key modifiers, and encrypting 303 data using the derived encryption key. A cryptographic blob can be generated 304 for virtualized long-term protected storage that is accessible only to the operating system specified by the operating system tag.

In some embodiments and/or applications, a method 310 of operating an electronic circuit can further include receiving 311 a cryptographic blob from storage, and decrypting 312 the cryptographic blob using the blob key. Further embodiments of a method 320 of operating an electronic circuit can further include performing 321 a secure boot, validating 322 the secure boot system software, placing 323 the electronic circuit in a trusted state, and enabling 324 access of the cryptographic engine to the master secret key.

An embodiment of a method 330 of operating an electronic circuit can further include tagging 331 a cryptographic blob with a security state of the electronic circuit, a user-specified application tag, and the operating system tag. A further embodiment of a method 340 of operating an electronic circuit can include enforcing 341 the operating system tag by the electronic circuit such that the operating system tag is unmodifiable by the operating system. In various embodiments and/or applications, a method 350 of operating an electronic circuit can further include associating 351 the operating system tag including a security domain identifier with the operating system.

Further embodiments of a method 360 of operating an electronic circuit can further include configuring 361 the cryptographic engine for a plurality of operating systems, programming 362 at least one memory management unit for operating system separation, and allocating 363 one or more of a plurality of interface portals respectively to one or more of the plurality of operating systems.

Figure 4:
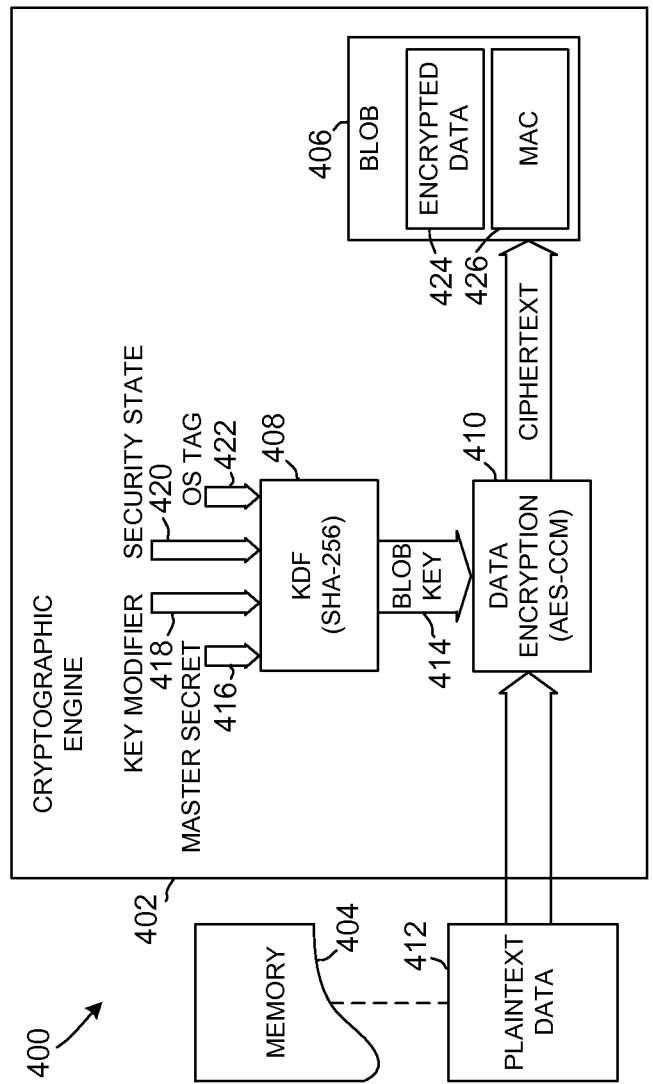
FIG. 4 is a schematic block diagram depicting an embodiment of a storage system adapted for encrypting information and storing the encrypted data in a cryptographic blob.

Referring to FIG. 4, a schematic block diagram depicts an embodiment of a storage system 400 adapted for encrypting information and storing the encrypted data in a cryptographic blob. The storage system 400 includes a cryptographic engine 402 and memory 404. The cryptographic engine 402 is configured to create a cryptographic blob 406. The illustrative cryptographic engine 402 includes a key derivation function (KDF) 408 and an encryption block 410. The cryptographic engine 402 receives plaintext data 412 from the memory 404 which is encrypted by the encryption block 410, for example using Advanced Encryption Standard-Counter mode with CBC-MAC (AES-CCM) encryption and the blob key 414. In various embodiments suitable encryption can be via AES-CCM as AES Counter mode with CBC-MAC, or AES with Counter mode and Cipher Block Chaining-Message Authentication Code. Other algorithms and modes may also be used. The encryption block 410 can encrypt the plaintext data 412 using a blob key 414 derived by the key derivation function 408 from a device master secret 416 and key modifiers such as a key modifier 418, security state information 420, and an operating system tag 422 that can be generated from a register in a software portal.

The cryptographic blob 406 includes several components such as encrypted data 424 and a Message Authentication Code (MAC) 426. The MAC 426 is an integrity metric for inclusion as part of the blob 406 to ensure that unauthorized modification of the blob will be detected. Other embodiments can use other suitable information flow.

In an illustrative embodiment, the key derivation function 408 receives the master secret 416, a key modifier 418, security state information 420, and an operating system tag 422. In a specific example implementation, the master secret 416 can be a 256-bit data element that is chip-specific, with a different value in every chip. The key modifier 418 can be a 128-bit user tag that is supplied by a user and can be an application tag, identifying a specific software application, or the key modifier can be a blob type tag, identifying a specific blob type, or both, identifying both a specific software application and a specific blob type. The operating system tag 422 can be hardware-generated from a register in a software portal. The security state information 420 can be used to specify whether the system is in a secure state or a non-secure state. In some embodiments, the security state can specify finer gradations or different levels of security. The operating system tag 422 can be a hardware-specific tag or a software-specific tag such as a SDID. The secret information and tags can be combined and hashed to form a blob key.

In example embodiments and/or applications, various levels of security state can be defined. For example, during processing a chip such as in manufacture when the circuit is on a wafer, one example security state can enable wide open access for complete access to chip resources via a tester. During fabrication or manufacturing, the chip can be placed in a fabrication state, allowing full access for testing. When the chip is sent to a customer, the security state can be placed in a code development state, possibly a non-secure state. When a code developer has finished code development, the chip can be placed in an end product state for delivery to an end customer. The end product state can run in a trusted secure state. In another possible security state example, after reset a chip can be in a secure boot state, during which secure boot is running, before being placed into the trusted state. The customer may detect a performance problem or other failure and send the chip back to an Original Equipment Manufacturer (OEM) for analysis in which the chip is returned in a field return state allowing testing and analysis but without revealing end-user's secrets programmed onto the chip. The field return state can otherwise be similar to the fabrication state. Other suitable states are possible. In addition, a chip can be in a trusted, secure state for execution by the end user.

The master secret 416, which can also be called a device master secret, can be held in a suitable nonvolatile storage on the chip, such as in fuses. During fabrication of the chip, a fuse box can be programmed to hold the master secret, wired directly from the fuse box into the hardware module. No software has access to the master secret 416. Similarly, no other access to the master secret 416 is available except by the hardware module—the encryption engine 402.

The user tag 418 can be used, for example, to create a cryptographic blob 406 that contains a key used for encrypting a storage device such as a disk drive. An example user tag 418 for a particular user can be a number, such as 5, which, in combination with the other inputs to the KDF, causes the KDF to generate a specific disk encryption key. The system can also use HDCP keys that are associated with HDCP and placed into a cryptographic blob 406 that is tagged with another number such as 12 so that 12 identifies blobs that contain HDCP keys. A user can change the value of the user tag 418, which provides separation among blobs 406 created for or on behalf of a particular user. A user may desire software to be encrypted, thereby disallowing use by other users, and may thus place the software into a blob. The software may not be encrypted on the disk with a disk encryption key but rather simply placed into a blob 406. The blob 406 can be tagged, for example with a value of 21, to identify the blob containing the encrypted software. When the blob is unpacked, the user can specify that a blob of encrypted code exists and is tagged with the value 21. If another user has replaced the blob containing the encrypted software with another blob, such as a HDCP blob that was encrypted using a user tag other than 21, then the tag will be incorrect and decryption will not be available. The user tag thus enables a user to create user-defined separation between blobs. The user tag is enforced by the user. In contrast, the operating system tag is hardware-enforced. The user is allowed to change the user tag but not to change the operating system tag. The master secret 416 remains the same even though the security state 420 changes.

The user tag 418 is user-selectable. In contrast, when a device 400 is running out in the field and the end product is running in the trusted state, the operating system tag 422 does not change. The operating system tag 422, for example the SDID, is selected by the hypervisor and provides separation between the operating systems. Different tags can be used including some hardware tags, some software tags, and some hypervisor tags. In combination, the tags supply some of many different dimensions of separation.

The key modifier 418, which can also be called a user tag, can be stored in a register. In various embodiments and/or conditions, the key modifier 418 can be written to a register on the cryptographic engine 402 or a command to the encryption engine can hold the value.

The security state information 420 originates from hardware indicative of the cryptographic module security state. For example, the security state information 420 can be accessed via wires directly from hardware.

The operating system tags 422 can be an SDID received from a portal, if the system includes portals, and can be accessed from an appropriate SDID register for a particular operating system. A system that does not have portals can access an SDID register in the cryptographic engine 402 such as a group of flip-flops that can be written directly by a hypervisor, for example. Once software has written the SDID value, the information is available by hardwired connection to the remainder of the cryptographic engine 402.

The cryptographic engine 402 can respond to control using various techniques such as via receipt of commands written to registers. For example, a cryptographic engine 402 can receive a command to perform some operation in which a user tag can be written into a specific register, and a pointer to data can be written into a specific register. However in an illustrative embodiment, the cryptographic engine 402 can be run via commands in the form of descriptors. Accordingly, the cryptographic blob 406 can receive a descriptor, the length of the data to be entered into a cryptographic blob 406 can be written to a register, and a command can be written to a command register that instructs the cryptographic engine 402 to create a cryptographic blob 406 from the received information. Hardware in the cryptographic engine 402 can respond to the command by accessing information for creating the blob 406, and transferring the cryptographic blob 406 to a specified location, for example in memory or other storage.

Typically, guest operating systems send descriptors to the cryptographic engine 402, for example by a request of a user application that is sent to a guest operating system, although the hypervisor can also send descriptors. Then the operating system sends a request to the cryptographic engine 402 on behalf of the user or that user application. But the hypervisor can also use cryptographic engine 402 by sending the hypervisor's SDID. The hypervisor would have to be trusted because the hypervisor can put in the SDID of one of the guest operating systems and can receive access to guest operating systems blobs.

The data structure of the blob is eventually written back out to memory 404. During creation, the cryptographic blob 406 can be considered to be within the cryptographic engine 402, but once encrypted can be saved anywhere, for example to memory 404. The cryptographic blob 406 does not have to remain within cryptographic engine 402. When the chip is powered-off, a desired condition is that the blob 406 remains for subsequent usage, for example written to disk or to external nonvolatile memory, whether flash, hard drive, or other storage.

The cryptographic blob 406 can be introduced to the cryptographic engine 402 as outside data and can be brought into the cryptographic engine 402 and written back out. The cryptographic blob 406 can be any size, with no length limitation, or can stream into the cryptographic engine 402, be encrypted and written back out during streaming. After processing by the cryptographic engine 402, the blob 406 is transferred back out, for example to memory or other storage, in encrypted form. Thus, the cryptographic blob 406, depending on size, can be fully contained within the cryptographic engine 402 for subsequent transfer out to storage or for communication. Otherwise, the cryptographic blob 406 can be in memory or other storage. The cryptographic blob 406 is encrypted for secure storage on the chip, and also off-chip on external long-term flash memory or a disk drive.

Figure 5:
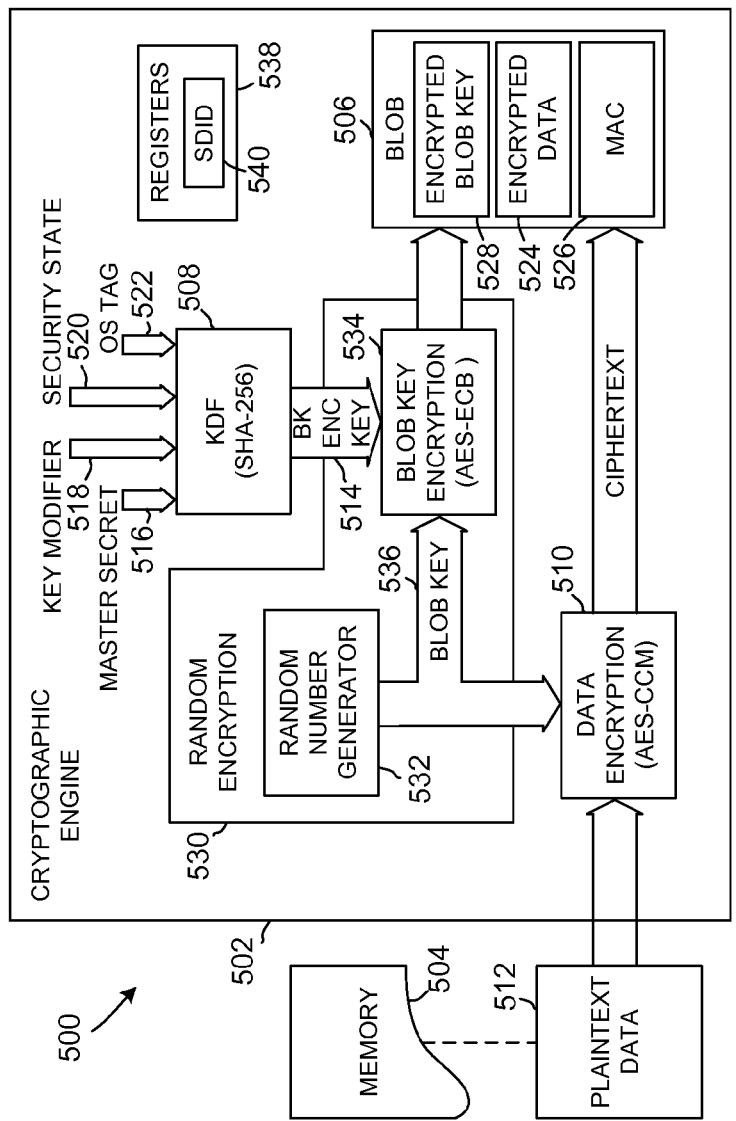
FIG. 5 is a schematic block diagram showing an embodiment of a storage system adapted for encrypting information using random number generation for key creation and storing the encrypted data in a cryptographic blob.

Referring to FIG. 5, a schematic block diagram depicts an embodiment of a storage system 500 adapted for encrypting information using a blob key created via random number generation and storing the encrypted data in a cryptographic blob. In the shown embodiment, a different random blob key is used for encrypting each blob. The random blob key is encrypted by a blob key encryption key generated by the key derivation function, and the encrypted blob key is stored with the blob. The storage system 500 includes a cryptographic engine 502 and memory 504 and is configured to create a cryptographic blob 506. The cryptographic engine 502 includes a key derivation function 508, data encryption block 510, and a blob key encryption block 534. The cryptographic engine 502 receives plaintext data 512 from the memory 504 which is encrypted by the data encryption block 510, for example using AES-CCM encryption and a blob key 536. The data encryption block 510 can encrypt the plaintext data 512 using a randomized blob key from the random encryption block 530. The random encryption block 530 can include a random number generator 532 and a blob key encryption block 534 that receives a blob key 536 from the random number generator 532 which is encrypted by the encryption block 534, for example using AES-Electronic Code Book (AES-ECB) encryption and the blob key encryption key 514. The encryption block 534 can encrypt the blob key 536 using blob key encryption key 514 derived by the key derivation function 508 from a device master secret 516 and other information such as a key modifier 518, security state information 520, and an operating system tag 522 that can be generated from a register in a software portal.

The key derivation function 508 receives the specified tags, performs the key derivation operation, and generates a blob key encryption key 514. The blob key encryption key 514 is used to encrypt the blob key 536. The encrypted blob key 528 must be stored with the blob 506 for later use when the blob is decrypted. The blob data 524 is encrypted using the blob key 536 which is applied to the AES-CCM encryption block 510 and the resulting ciphertext and integrity check value is stored in the blob 506 as the encrypted data 524 and MAC 526, respectively. The random blob key 536 is generated and held in unencrypted form only within the hardware of the cryptographic engine 502. Thus the cryptographic engine 502 generates a random blob key 536, encrypts all the data, encrypts the random blob key 536 with the blob key encryption key 514, and outputs the encrypted blob key 528, but the blob key encryption key, which is the output of that SHA function or KDF key derivation function is held inside the hardware module (cryptographic engine 502) and never leaves. When creation of the blob is complete, the random blob key is discarded. When the blob is to be decrypted, the blob key encryption key is regenerated and used to decrypt the encrypted blob key stored within the blob. The decrypted blob key is now available for use in decrypting the encrypted data stored within the blob. Once the encrypted data has been decrypted, the blob key is discarded and is only present long enough to encrypt or decrypt the blob.

The cryptographic engine 502 generates the random blob key 536 so that every cryptographic blob 506 is encrypted with a random value. The random blob key 536 is encrypted and attached to the cryptographic blob 506 so that the encrypted key 528, the encrypted data 524, and the MAC 526 are part of the cryptographic blob 506.

Figure 6:
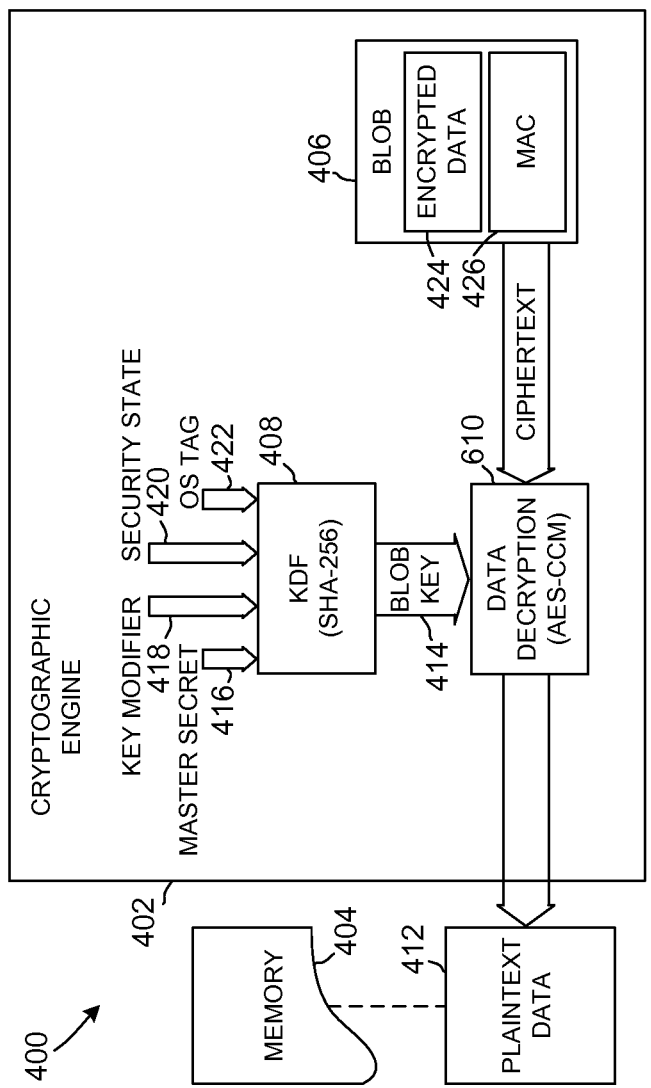
FIG. 6 is a schematic block diagram illustrating an embodiment of a storage system adapted for decrypting data from a cryptographic blob.
Figure 7:
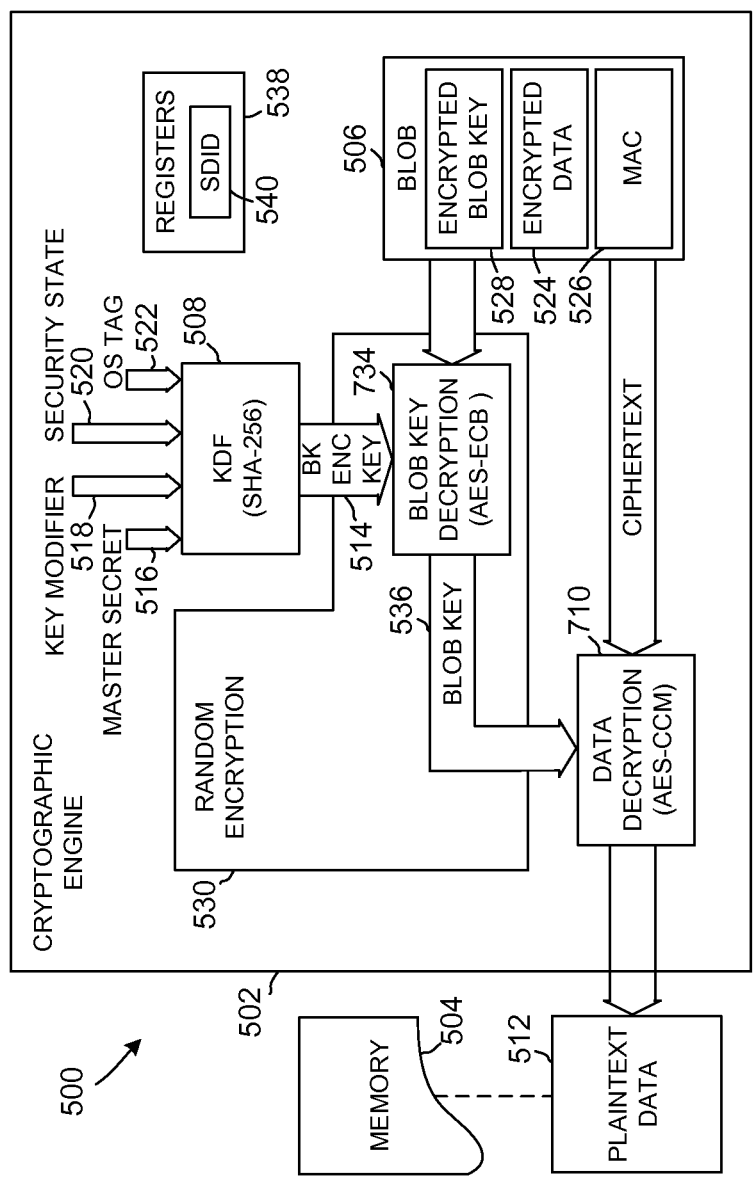
FIG. 7 is a schematic block diagram illustrating an embodiment of a storage system adapted for decrypting data from a cryptographic blob using random number generation.

To decrypt the blob, the operations can be reversed using a blob key encryption key that is generated exactly the same way as for encryption. Referring to FIGS. 6 and 7, schematic block diagrams illustrate embodiments of storage systems adapted for decrypting data from a cryptographic blob. To recover the encrypted data, the blob key 414 or blob key encryption key 514 is generated using the tags, master secret, user key modifier, state information, and the operating system tag. In the embodiment illustrated in FIG. 6, the blob key 414 is used by a decryption block 610 to decrypt the encrypted data within the blob and to check the MAC to determine whether the encrypted data was properly decrypted using the blob key produced by the key derivation function. In the embodiment illustrated in FIG. 7, the blob key encryption key (which is the same as the decryption key when using a symmetric encryption system) is used by decryption block 734 to decrypt the encrypted blob key. The now-decrypted blob key can then be used by decryption block 710 to decrypt the encrypted data, as just described. Note that the Random Number Generator that was used during the encryption process is not needed during the decryption process.

Each time the cryptographic engine 402, 502 receives a descriptor to access a blob 406, 506 by the same operating system, the cryptographic engine 402, 502 uses the same SDID as is applied to the Key Derivation Function, which uses the equation, as follows, to derive Blob_Key_1 414 or Blob_Key_Encryption_Key_1 514:

Blob_Key_1=SHA256(Master_Secret, User_Tag, Security_State, SDID_1), or
Blob_Key_Enc_Key_1=SHA256(Master_Secret, User_Tag, Security_State, SDID_1).

If the cryptographic engine 402, 502 receives a descriptor to access a blob 406, 506, but by a different operating system, the cryptographic engine 402, 502 derives the blob key 414, or blob key encryption key 514 according to the equation:

Blob_Key_2=SHA256(Master_Secret, User_Tag, Security_State, SDID_2), or
Blob_Key_Enc_Key_2=SHA256(Master_Secret, User_Tag, Security_State, SDID_2).

The decryption of the blob 406, 506 using Blob_Key_2 or Blob_Key_Encryption_Key_2 will fail because the MAC stored with the blob will not match the MAC produced by the cryptographic engine during the AES-CCM decryption of the ciphertext.

In the various embodiments shown in FIGS. 4, 5, 6, and 7, the operating system tag can be a hardware-generated identifier or a software-generated identifier. In some embodiments, an SDID can be used as the operating system tag. For example, the SDID can be set distinctively for selected operating systems within a set of multiple guest operating systems such that the selected guest operating systems can each encrypt and decrypt their own blobs, but cannot encrypt or decrypt another operating system's blobs. For usage by multiple guest operating systems, a hypervisor can program the SDID values when a particular guest operating system is in operation.

Referring to FIGS. 5 and 7, in some embodiments, a hypervisor can set the SDID for operating systems configured for usage by the cryptographic engine 502. When a first operating system runs the encryption module 502, the SDID for the first operating system can be set, for example, to the value 1. When a second operating system runs, the SDID for the second operating system can be set to the value 2. The valid SDID values can be stored in registers 540 programmed by the hypervisor, generally the most trusted software on the chip, for the individual guest operating systems. The registers 540 are positioned in locations that cannot be accessed by the guest operating systems.

The SDID has multiple aspects of functionality. The SDID identifies the appropriate operating system and also specifies the security domain within which the operating system is executing. The SDID enables support for multiple separate security domains. The SDID identifies the resources which are specific to each security domain.

In an illustrative embodiment, the cryptographic engine 502 can be configured to distinguish between different software components, for example recognizing the hypervisor component which is allowed to specify the SDIDs, and distinguishing the hypervisor from guest operating system software components which are allowed to create and attempt to use the descriptors. More particularly, when a first operating system passes a descriptor to a cryptographic engine 502, the cryptographic engine 502 facilitates maintenance of separation by identifying the descriptor as being received from the operating system and thus applying the proper SDID value. If a descriptor is received from a second operating system, the cryptographic engine 502 can identify the descriptor to apply the correct SDID value for the second operating system. One implementation for identifying the descriptor can be the use of an SDID register for use to allow only one operating system to have access to the cryptographic engine 502. In one arrangement, the cryptographic engine 502 or other hardware can assume that the operating system is using whatever SDID is programmed into the SDID register by the hypervisor. Another implementation for identifying the descriptor is the use of a software portal for which individual operating systems can issue a request to hardware that is identified by the software module that is used. The software portal can be a block of address space in which a first operating system passes information through one address space and a second operating system passes information through another address space. The hypervisor can program a memory control device such as a MMU to restrict access of each software portal to the proper operating system. Internal to hardware, the cryptographic engine 502 can use the software portal to identify the operating system and access the proper SDID value to use with that trusted descriptor.

Thus, the SDID can be used as the operating system tag which is set by the hypervisor, enabling the operating system to realize its associated security state, but not to change identity to appear as a different operating system. Hardware identifiers that can be used in a manner similar to the SDID or other software identifiers include a logical input/output device number or Master Identifier (MID) which can be on-chip hardware identifiers.

Figure 8:
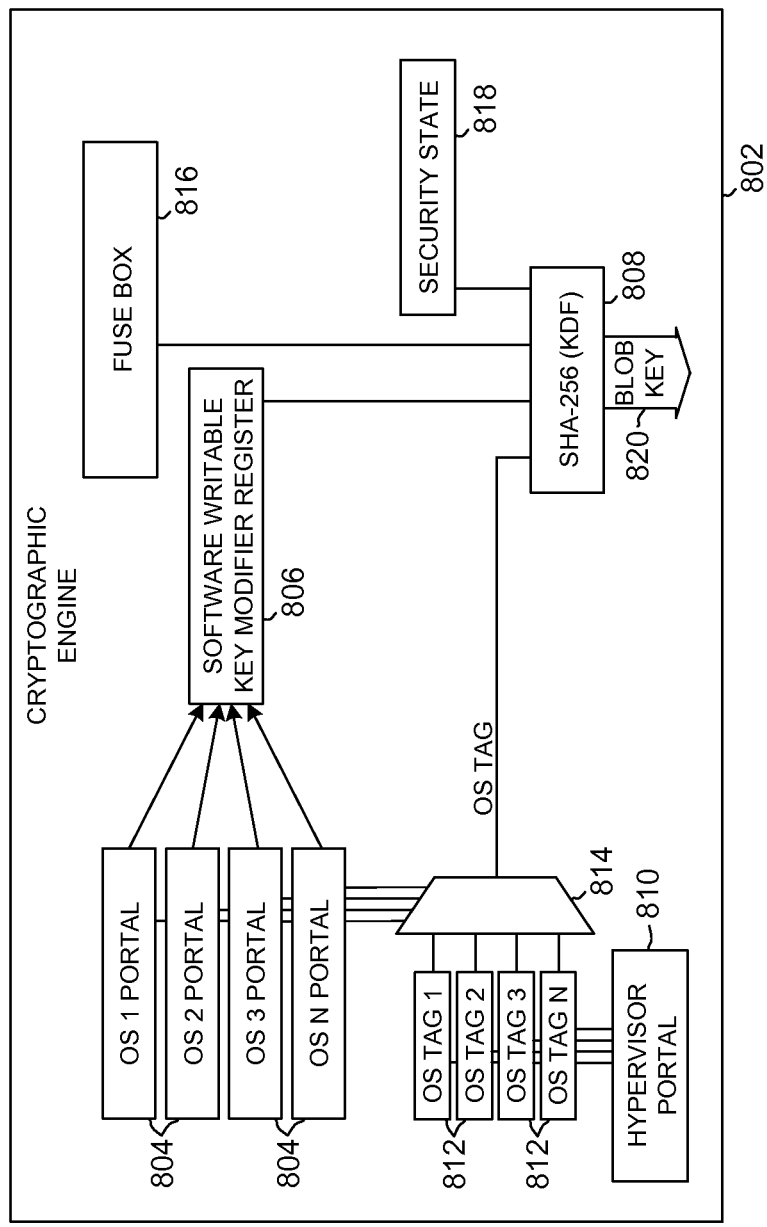
FIG. 8 is a schematic block diagram showing an embodiment of the portion of a cryptographic engine including a key derivation function and information applied to the key derivation function.

Referring to FIG. 8, a schematic block diagram shows an embodiment of the portion of a cryptographic engine 802 including a key derivation function 808 and information applied to the key derivation function 808. The illustrative cryptographic engine 802 includes operating system portals 804 that can be used to write to a software writable key modifier register 806, and a hypervisor portal 810 with multiple operating system tags 812 and a multiplexer 814 which can be controlled by the operating system portals 804. A fuse box 816 can contain a device master secret. Security state can be held in a security state encoding element 818 such as in hardware on the cryptographic engine 802. The key derivation function 808 receives an operating system tag from the hypervisor portal 810, and information from the key modifier register 806, the fuse box 816, and the security state encoding element 818 to derive the blob key or encryption key 820. In an example arrangement, the software portal can be an address space, for example 4 kilobytes, in a register map with access controlled by a memory management unit.

The term "coupled", as may be used herein, includes direct coupling and indirect coupling via another component or element where, for indirect coupling, the intervening component or element does not modify the operation. Inferred coupling, for example where one element is coupled to another element by inference, includes direct and indirect coupling between two elements in the same manner as "coupled".

While the principles of the disclosed system are described above in connection with specific apparatus, it is to be clearly understood that this description is made only by way of example and not as a limitation on scope of the appended claims. The illustrative pictorial diagrams depict structures and process actions in a secure communication process. Although the particular examples illustrate specific structures and process acts, many alternative implementations are possible and commonly made by simple design choice. Actions may be executed in different order from the specific description herein, based on considerations of function, purpose, conformance to standard, legacy structure, and the like.

An embodiment of an electronic circuit includes a cryptographic engine which includes a key derivation function and encryption logic. The key derivation function combines a master secret key with a plurality of key modifiers including at least an operating system tag specific to an operating system, and derives an encryption key from the combined master secret key and plurality of key modifiers. The encryption logic is coupled to the key derivation function and encrypts data using the derived encryption key to generate a cryptographic binary large object (blob) for virtualized long-term protected storage that is accessible only to the operating system specified by the operating system tag. According to a further embodiment, the electronic circuit can be configured such that the cryptographic engine further includes a key derivation function that derives a blob key encryption key from the combined master secret key and plurality of key modifiers, a random number generator that generates a random blob key, and encryption logic coupled to the key derivation function and the random number generator that encrypts the random blob key using the derived blob key encryption key to generate an encrypted random blob key that is stored with the blob. According to a further embodiment, the electronic circuit can be configured such that the cryptographic engine receives a cryptographic blob from a storage, and the encryption logic decrypts the cryptographic blob using the encryption key. According to a further embodiment, the electronic circuit can further include secure boot logic that performs a secure boot that validates system software and places the electronic circuit in a trusted state enabling access by the cryptographic engine to the master secret key. According to a further embodiment, the electronic circuit can be configured such that the encryption logic generates a cryptographic blob that is tagged with a security state of the electronic circuit, a user-specified application tag, and the operating system tag. According to a further embodiment, the electronic circuit can be configured such that the operating system tag is enforced by the electronic circuit and unmodifiable by the operating system, and the operating system tag is a security domain identifier associated with the operating system. According to a further embodiment, the electronic circuit can further include at least one interface portal and the operating system tag is a hardware interface tag specified by the at least one interface portal. According to a further embodiment, the electronic circuit can further include at least one memory management unit, a plurality of interface portals, and a control operating system that configures the cryptographic engine for a plurality of operating systems, and programs the at least one memory management unit for operating system separation. The cryptographic engine is configured to allocate ones of the plurality of interface portals respectively to ones of the plurality of operating systems.

An embodiment of a method of operating an electronic circuit includes combining a master secret key with a plurality of key modifiers including at least an operating system tag specific to an operating system, deriving an encryption key from the combined master secret key and plurality of key modifiers, encrypting data using the encryption key, and generating a cryptographic binary large object (blob) for virtualized long-term protected storage that is accessible only to the operating system specified by the operating system tag. According to a further embodiment, the method of operating an electronic circuit further includes deriving a blob key encryption key from the combined master secret key and plurality of key modifiers, generating a random blob key, encrypting the random blob key using the derived blob key encryption key, and generating an encrypted random blob key that is stored with the blob. According to a further embodiment, the method of operating an electronic circuit further includes receiving a cryptographic blob from a storage, and decrypting the cryptographic blob using the encryption key. According to a further embodiment, the method of operating an electronic circuit further includes performing a secure boot, validating via the secure boot system software, and placing the electronic circuit in a trusted state enabling access of the cryptographic engine to the master secret key. According to a further embodiment, the method of operating an electronic circuit further includes tagging a cryptographic blob with a security state of the electronic circuit, a user-specified application tag, and the operating system tag. According to a further embodiment, the method of operating an electronic circuit further includes enforcing the operating system tag by the electronic circuit such that the operating system tag is unmodifiable by the operating system, and associating the operating system tag including a security domain identifier with the operating system. According to a further embodiment, the method of operating an electronic circuit further includes configuring the cryptographic engine for a plurality of operating systems, programming at least one memory management unit for operating system separation, and allocating ones of a plurality of interface portals respectively to ones of the plurality of operating systems.

An embodiment of a virtualized protected storage system includes at least one memory management unit, a plurality of interface portals, a control operating system, and a cryptographic engine. The control operating system runs a plurality of operating systems, and programs the at least one memory management unit for operating system separation and allocates ones of the plurality of interface portals respectively to ones of the plurality of operating systems. The cryptographic engine includes a key derivation function and encryption logic. The key derivation function combines a master secret key with a plurality of key modifiers including at least an operating system tag specific to an operating system, and derives an encryption key from the combined master secret key and plurality of key modifiers. The encryption logic is coupled to the key derivation function and encrypts data using the derived encryption key to generate a cryptographic binary large object (blob) that is accessible only to the operating system specified by the operating system tag. According to a further embodiment, the virtualized protected storage system can be configured such that the cryptographic engine further includes a key derivation function that derives a blob key encryption key from the combined master secret key and plurality of key modifiers, a random number generator that generates a random blob key, and encryption logic coupled to the key derivation function and the random number generator that encrypts the random blob key using the derived blob key encryption key to generate an encrypted random blob key that is stored with the blob. According to a further embodiment, the virtualized protected storage system further includes a storage, a cryptographic engine that is configured to receive a cryptographic blob from the storage, encryption logic configured to decrypt the cryptographic blob using the encryption key, and secure boot logic that performs a secure boot that validates system software and places the virtualized protected storage system in a trusted state enabling access by the cryptographic engine to the master secret key. According to a further embodiment, the virtualized protected storage system is configured such that the encryption logic generates a cryptographic blob that is tagged with a security state of the virtualized protected storage system, a user-specified application tag, and the operating system tag, and the operating system tag is a security domain identifier associated with the operating system and is enforced by the cryptographic module and unmodifiable by the operating system. According to a further embodiment, the virtualized protected storage system further includes at least one interface portal such that the operating system tag is a hardware interface tag specified by the at least one interface portal.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, components, configurations, and topologies are given by way of example only. The parameters, components, configurations, and topologies can be varied to achieve the desired structure as well as modifications, which are within the scope of the claims. Variations and modifications of the embodiments disclosed herein may also be made while remaining within the scope of the following claims.

What is claimed is:

1. An electronic circuit comprising:
a cryptographic circuit comprising:
a key derivation function that combines a master secret key with a plurality of key modifiers comprising at least an operating system tag specific to an operating system, and derives an encryption key from the combined master secret key and plurality of key modifiers; and
encryption logic coupled to the key derivation function that encrypts data using the derived encryption key to generate a cryptographic binary large object (blob) that is tagged with a security state of the electronic circuit and the operating system tag for virtualized protected storage that is accessible only to the operating system specified by the operating system tag.

2. The electronic circuit according to claim 1 wherein the cryptographic engine further comprises:
the key derivation function that derives a blob key encryption key from the combined master secret key and plurality of key modifiers;
a random number generator that generates a random blob key; and
encryption logic coupled to the key derivation function and the random number generator that encrypts the random blob key using the derived blob key encryption key to generate an encrypted random blob key that is stored with the blob.

3. The electronic circuit according to claim 1 wherein:
the cryptographic engine is configured to receive a cryptographic blob from a storage; and
the encryption logic is configured to decrypt the cryptographic blob using the encryption key.

4. The electronic circuit according to claim 1 further comprising:
secure boot logic that performs a secure boot that validates system software and places the electronic circuit in a trusted state enabling access by the cryptographic engine to the master secret key.

5. The electronic circuit according to claim 1 wherein:
the cryptographic blob further includes a user-specified application tag.

6. The electronic circuit according to claim 1 wherein:
the operating system tag is enforced by the electronic circuit and unmodifiable by the operating system; and
the operating system tag is a security domain identifier associated with the operating system.

7. The electronic circuit according to claim 1 further comprising:
at least one interface portal; wherein:
the operating system tag is a hardware interface tag specified by the at least one interface portal.

8. The electronic circuit according to claim 1 further comprising:
at least one memory management unit;
a plurality of interface portals; and
a control operating system that configures the cryptographic engine for a plurality of operating systems, and programs the at least one memory management unit for operating system separation wherein the cryptographic engine is configured to allocate ones of the plurality of interface portals respectively to ones of the plurality of operating systems.

9. A method of operating an electronic circuit comprising:
combining a master secret key with a plurality of key modifiers comprising at least an operating system tag specific to an operating system;
deriving an encryption key from the combined master secret key and plurality of key modifiers;
encrypting data using the encryption key; and
generating a cryptographic binary large object (blob) that is tagged with a security state of the electronic circuit and the operating system tag for virtualized protected storage that is accessible only to the operating system specified by the operating system tag.

10. The method of operating the electronic circuit according to claim 9 further comprising:
deriving a blob key encryption key from the combined master secret key and plurality of key modifiers;
generating a random blob key;
encrypting the random blob key using the derived blob key encryption key; and
generating an encrypted random blob key that is stored with the blob.

11. The method of operating the electronic circuit according to claim 9 further comprising:
receiving a cryptographic blob from a storage; and
decrypting the cryptographic blob using the encryption key.

12. The method of operating the electronic circuit according to claim 9 further comprising:
performing a secure boot;
validating, via the secure boot, system software; and
placing the electronic circuit in a trusted state enabling access of the cryptographic engine to the master secret key.

13. The method of operating the electronic circuit according to claim 9 further comprising:
tagging the cryptographic blob with user-specified application tag.

14. The method of operating the electronic circuit according to claim 9 further comprising:
enforcing the operating system tag by the electronic circuit wherein the operating system tag is unmodifiable by the operating system; and
associating the operating system tag comprising a security domain identifier with the operating system.

15. The method of operating the electronic circuit according to claim 9 further comprising:
configuring the cryptographic engine for a plurality of operating systems;

programming at least one memory management unit for operating system separation; and allocating ones of a plurality of interface portals respectively to ones of the plurality of operating systems.

16. A virtualized protected storage system comprising:
   at least one memory management unit;
   a plurality of interface portals;
   a control operating system that runs a plurality of operating systems, and programs the at least one memory management unit for operating system separation and allocates ones of the plurality of interface portals respectively to ones of the plurality of operating systems; and
   a cryptographic circuit comprising:
      a key derivation function that combines a master secret key with a plurality of key modifiers comprising at least an operating system tag specific to an operating system, and derives an encryption key from the combined master secret key and plurality of key modifiers; and
      encryption logic coupled to the key derivation function that encrypts data using the derived encryption key to generate a cryptographic binary large object (blob) that is tagged with a security state of the electronic circuit and the operating system tag and that is accessible only to the operating system specified by the operating system tag.

17. The virtualized protected storage system according to claim 16 wherein the cryptographic engine further comprises:
   the key derivation function that derives a blob key encryption key from the combined master secret key and plurality of key modifiers;
   a random number generator that generates a random blob key; and
   encryption logic coupled to the key derivation function and the random number generator that encrypts the random blob key using the derived blob key encryption key to generate an encrypted random blob key that is stored with the blob.

18. The virtualized protected storage system according to claim 16 further comprising:
   a storage;
   the cryptographic engine configured to receive a cryptographic blob from the storage;
   the encryption logic configured to decrypt the cryptographic blob using the encryption key; and
   secure boot logic that performs a secure boot that validates system software and places the virtualized protected storage system in a trusted state enabling access by the cryptographic engine to the master secret key.

19. The virtualized protected storage system according to claim 16 wherein:
   the cryptographic blob further includes a user-specified application tag; and
   the operating system tag is a security domain identifier associated with the operating system and is enforced by the cryptography module and unmodifiable by the operating system.

20. The virtualized protected storage system according to claim 16 further comprising:
   at least one interface portal; wherein:
   the operating system tag is a hardware interface tag specified by the at least one interface portal.

* * * * *